United States Patent
Toskala et al.

(10) Patent No.: US 9,913,158 B2
(45) Date of Patent: Mar. 6, 2018

(54) ENHANCED NETWORK PERFORMANCE MONITORING

(75) Inventors: Antti Anton Toskala, Espoo (FI); Malgorzata Tomala, Nowe Miasto nad Pilica (PL)

(73) Assignee: Nokia Solutions and Networks Oy, Espoo (FI)

( * ) Notice: Subject to any disclaimer, the term of this patent is extended or adjusted under 35 U.S.C. 154(b) by 572 days.

(21) Appl. No.: 13/504,171

(22) PCT Filed: Oct. 29, 2009

(86) PCT No.: PCT/EP2009/064294
§ 371 (c)(1),
(2), (4) Date: Jul. 20, 2012

(87) PCT Pub. No.: WO2011/050846
PCT Pub. Date: May 5, 2011

(65) Prior Publication Data
US 2012/0282968 A1    Nov. 8, 2012

(51) Int. Cl.
*H04W 24/10*    (2009.01)
(52) U.S. Cl.
CPC .................................. *H04W 24/10* (2013.01)
(58) Field of Classification Search
CPC ......... H04L 43/04; H04L 43/06; H04L 43/08; H04L 47/10; H04W 24/00–24/10
USPC ................... 455/423–425; 370/231
See application file for complete search history.

(56) References Cited

U.S. PATENT DOCUMENTS

| | | | |
|---|---|---|---|
| 2004/0110500 A1* | 6/2004 | Koskela ................ | H04W 48/18 455/422.1 |
| 2004/0248605 A1 | 12/2004 | Cao et al. | |
| 2007/0123224 A1* | 5/2007 | Nishiyama et al. ....... | 455/414.1 |
| 2009/0203352 A1* | 8/2009 | Fordon ................ | H04M 15/00 455/406 |
| 2009/0227251 A1* | 9/2009 | Lei et al. ...................... | 455/425 |
| 2010/0054185 A1 | 3/2010 | Kaneko et al. | |
| 2011/0045821 A1* | 2/2011 | Tyce et al. .................... | 455/424 |

FOREIGN PATENT DOCUMENTS

| | | |
|---|---|---|
| CN | 101047974 A | 10/2007 |
| JP | 2010/062783 A | 3/2010 |

OTHER PUBLICATIONS

3GPP TSG-RAN WG2 #67bis, R2-095779, Oct. 12-16, 2009.*
R2-092988, "UE measurements and logs for Mobility Optimization", CATT, 3GPP TSG-RAN WG2 Meeting #66, San Francisco, US, May 4-8, 2009, 4 pgs.

(Continued)

Primary Examiner — Raymond Dean
(74) Attorney, Agent, or Firm — Harrington & Smith

(57) ABSTRACT

There are disclosed measures for enhancing network performance monitoring. Such measures may for example comprise receiving a report on measurements of terminal-related network performance parameters from a terminal, acquiring information of access network-related network performance parameters, and combining the received terminal-related network performance parameters and the acquired access network-related network performance parameters into a combined network performance report.

17 Claims, 8 Drawing Sheets

(56) References Cited

OTHER PUBLICATIONS

Tdoc R2-095779, "Discussion on architecture for MDT", Ericsson, ST-Ericsson, 3GPP TSG-RAN WG2 #67bis, Miyazaki, Japan, Oct. 12-16, 2009, 3 pgs.
R2-096290, "TR36.805 V1.2.1 on Study on Minimization of drive-tests in next generation networks", Qualcomm Europe, 3GPP TSG-RAN WG2 meeting #67, Miyazaki, Japan, Oct. 12-16, 2009, 22 pgs.
R3-091542, "MDT: Relation to SON functions", 3GPP TSG-RAN WG3 Meeting #65, Shenzhen, China, Aug. 24-28, 2009, 4 pgs.
3GPP TSG TS 36.314 V8.2.0 (Jun. 2009) Evolved Universal Terrestrial Radio Access E-UTRA Layer 2 Measurements (Release 8) 3GPP Technical Specification Group Radio Access Network (15 pages).
3GPP TSG-RAN WG2 meeting #66bis R2-094015 Los Angeles, US, Jun. 29-Jul. 3, 2009; Management aspects of minimization of drive tests (MDT) Qualcomm Europe (3 pages).
Telecom Italia et al R2-093271, Text Proposal for Requirement and constraints section of TR 36.805; 2009.
3GPP TR 36.805 v1.2.0 (Aug. 2009); 3rd Generation Partnership Project; Technical Specification Group Radio Access Network; Study on Minimization of drive-tests in Next Generation Networks (Release 9); 2009.

\* cited by examiner

ENHANCED NETWORK PERFORMANCE MONITORING

TECHNICAL FIELD

The present invention generally relates to techniques for enhanced network performance monitoring. Stated in other words, the present invention relates to enhancements in collecting and/or reporting performance data such as for example network performance data being usable for network coverage and/or capacity optimization purposes.

BACKGROUND

Network performance monitoring, i.e. collecting and/or reporting network performance data, is a vital task for network operators of any kind of communication network. A clear and complete picture of network performance, in particular in geographical problem areas or geographical areas intended for deployment of new network facilities, is important for the operator in order to be able to appropriately plan, deploy, and control its network facilities, or to enable self-optimization of networks.

In an effort to gain such a clear and complete picture of network performance, drive tests are usually employed, in which network performance data are gathered by cruising around, e.g. by car or train, and performing measurements of network performance parameters by means of a terminal device, e.g. a user equipment UE. Thereby, terminal-related network performance parameters may be measured either manually or automatically.

While manual and extensive drive tests have previously been common and necessary, automation as well as minimization of drive tests is currently desired to reduce network operation and maintenance costs, ensure faster optimization cycles, and to protect the environment by reducing carbon emissions.

In the following, reference is made to current efforts in automating and minimizing drive tests, which is intended as a non-limiting example for impacts of network performance monitoring.

Minimizing drive tests has currently been addressed in 3GPP (Third Generation Partnership Program), with the scope of the work being feasibility, benefits and complexity of automating the collection of UE measurements to minimize the need of manual drive tests. In this regard, the necessity of defining new capabilities for logging and reporting UE measurements for minimizing drive tests is being investigated.

A recent study on minimization of drive tests in next generation networks covers use cases defined in this field and some UE measurements addressing these use cases. The identified use cases aim to enable automatic methods for monitoring of network parameters.

In order to replace drive tests performed manually, new UE measurement logs (i.e. sets of measurements of specific entities) have been proposed. Corresponding UE measurements should be taken at the occurrence of a predefined trigger, which can be either periodical or a specific event, e.g. a failure event. In addition, location information could be attached to the measurements, if available, to make geographical areas distinguishable, which differ in network quality. The UE reports information based on the log it has provided.

However, when only the UE is sending measurement reports, as currently proposed, an analysis of the report, which is delivered periodically or when the terminal has encountered a problem, can not be sufficiently accurate. This is due to the lack of any information about the underlying network situation or network-related aspects of network performance, i.e. current and previous network performance data from the perspective of the network such as e.g. the (radio) access network. Since such information on the underlying network situation is expedient for a proper analysis of the overall network performance, the findings on the basis of an (incomplete) measurement report from the terminal are devaluated because of being weighted down with lost knowledge of the network performance.

Accordingly, in view of the above, there is a need for techniques for enabling the finding of a clear and complete picture of network performance even in automated and/or minimized network performance monitoring.

SUMMARY OF EXEMPLARY EMBODIMENTS OF THE INVENTION

Embodiments of the present invention are made to provide for a feasible solution for enhanced network performance monitoring. In particular, but not exclusively, embodiments of the present invention are made to overcome or at least mitigate above-outlined problems and drawbacks.

According to an exemplary first aspect of the present invention, there is provided a method comprising receiving a report on measurements of terminal-related network performance parameters from a terminal, acquiring information of access network-related network performance parameters, and combining the received terminal-related network performance parameters and the acquired access network-related network performance parameters into a combined network performance report.

According to further developments and/or modifications thereof, one or more of the following applies:
  the acquiring further comprises determining a triggering event and/or use case of the received measurement report on the basis of a predefined association between a triggering event and/or use case and measurements to be performed at the terminal, and selecting access network-related network performance parameters to be acquired based on the determined triggering event and/or use case,
  the method further comprises forwarding the combined network performance report to a network management element and/or an operation and maintenance element for network performance analysis and/or control,
  the method is operable at a device management element being interconnected with an access network element,
  the measurement report is received as user plane data from the terminal,
  the access network-related network performance parameters are acquired externally from the access network element,
  the method is operable at an access network element,
  the measurement report is received as control plane data from the terminal,
  the access network-related network performance parameters are acquired internally at the access network element,
  the device management element comprises an open mobile alliance device management server, and/or
  the access network element comprises one of a base station, a base transceiver station, a NodeB, and an eNodeB.

According to an exemplary second aspect of the present invention, there is provided an apparatus comprising a receiver configured to receive a report on measurements of terminal-related network performance parameters from a terminal, and an acquisition unit configured to acquire information of access network-related network performance parameters, and a combination unit configured to combine the received terminal-related network performance parameters and the acquired access network-related network performance parameters into a combined network performance report.

According to further developments and/or modifications thereof, one or more of the following applies:

the apparatus further comprises a determination unit configured to determine a triggering event and/or use case of the received measurement report on the basis of a predefined association between a triggering event and/or use case and measurements to be performed at the terminal, and a selection unit configured to select access network-related network performance parameters to be acquired based on the determined triggering event and/or use case, the apparatus further comprises a transmitter configured to forward the combined network performance report to a network management element and/or an operation and maintenance element for network performance analysis and/or control, the apparatus is operable as or at a device management element being interconnected with an access network element, the receiver is configured to receive the measurement report as user plane data from the terminal, the acquisition unit is configured to acquire the access network-related network performance parameters externally from the access network element, the apparatus is operable as or at an access network element, the receiver is configured to receive the measurement report as control plane data from the terminal, the acquisition unit is configured to acquire the access network-related network performance parameters internally at the access network element, the device management element comprises an open mobile alliance device management server, and/or the access network element comprises one of a base station, a base transceiver station, a NodeB, and an eNodeB.

According to an exemplary third aspect of the present invention, there is provided a computer program product comprising program code means being arranged, when run on a processor of an apparatus, to perform the method according to the above first aspect or any one of the further developments and/or modifications thereof. The apparatus, on which said computer program product may be run, is the apparatus according to the above second aspect or any one of the further developments and/or modifications thereof.

According to any one of the above aspects or any one of the further developments and/or modifications thereof, one or more of the following applies:

the terminal-related and/or the access network-related network performance parameters comprise parameters specific to one of minimization of drive tests for network performance monitoring and self optimization of networks, the terminal-related and/or the access network-related network performance parameters are associated with at least one of use cases for coverage optimization, mobility optimization, capacity optimization, parameterization for common channels, quality-of-service verification the measurements of terminal-related network performance parameters comprise one or more of periodical radio environment or downlink pilot measurements, radio environment measurements when a serving cell becomes worse than a threshold, transmit power headroom and radio environment measurements when a terminal's transmit power becomes less than a threshold, random access details and radio environment measurements when a random access failure occurs, radio environment, location, time and cell identity measurements when a paging channel failure occurs, and radio environment, location, time, cell identity and frequency measurements when a broadcast channel failure occurs, and/or the information on access network-related network performance parameters relates to one or more of access restriction parameters, network load parameters, traffic distribution parameters, congestion parameters, radio and/or hardware resource parameters, handover parameters, mobility parameters, dynamic connection parameters, signaling error parameters, and signaling events on a X2 interface between access network elements.

By way of exemplary embodiments of the present invention, there are provided techniques for enhanced network performance monitoring, for example for enhancements in collecting and/or reporting performance data such as network performance data.

By way of exemplary embodiments of the present invention, there are provided techniques for an involvement of an access network element such as e.g. an eNodeB in network performance monitoring and/or controlling. The involvement of the access network element is capable of advantageously complementing (network) performance monitoring and/or controlling enabled by a terminal.

By way of exemplary embodiments of the present invention, network performance monitoring and/or controlling may be accomplished by both a terminal conditions, such as terminal-related (network performance) parameters, and network conditions, such as access network-related network performance parameters.

By way of exemplary embodiments of the present invention, drive tests for network performance monitoring may be minimized and automated, while still enabling the finding of a clear and complete picture of network performance, and/or self-optimization of networks may be facilitated.

Further details may become more apparent from the subsequent description of exemplary embodiments with reference to accompanying drawings.

BRIEF DESCRIPTION OF THE DRAWINGS

In the following, exemplary embodiments of the present invention will be described in greater detail by way of non-limiting examples with reference to the accompanying drawings, in which.

DETAILED DESCRIPTION OF EXEMPLARY EMBODIMENTS OF THE INVENTION

The present invention is described herein with reference to particular non-limiting examples. A skilled person will appreciate that the invention is not limited to these examples, and may be more broadly applied.

In particular, the present invention and its embodiments are mainly described in relation to 3GPP specifications being used as non-limiting examples for certain exemplary network configurations and deployments. In particular, minimization of drive test for network performance monitoring on the basis of a 3GPP-based network is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, embodiments of the present invention may be applicable in any system with the need for monitoring network performance preferably with minimum efforts in an automated manner, such as for example in self-optimizing networks, irrespective of the underlying network environment. Embodiments of the present invention may be applicable for/in any kind of modern and future communication network including mobile/wireless communication networks, such as for example Global System for Mobile Communication (GSM), General Packet Radio Service (GPRS), Universal Mobile Telecommunication System (UMTS), Wideband Code Division Multiple Access (WCDMA), Long-Term Evolution (LTE), Long-Term Evolution Advanced (LTE-A), Wireless Interoperability for Microwave Access (WiMAX), evolved High Rate Packet Data (eHRPD), Evolved Packet Core (EPC), or other 3GPP (3GPP: Third Generation Partnership Project) or IETF (Internet Engineering Task Force) networks.

Hereinafter, various embodiments and implementations of the present invention and its aspects or embodiments are described using several alternatives. It is generally to be noted that, according to certain needs and constraints, all of the described alternatives may be provided alone or in any conceivable combination (also including combinations of individual features of the various alternatives).

In the following, exemplary embodiments of the present invention are described with reference to methods, procedures and functions.

Figure 1:
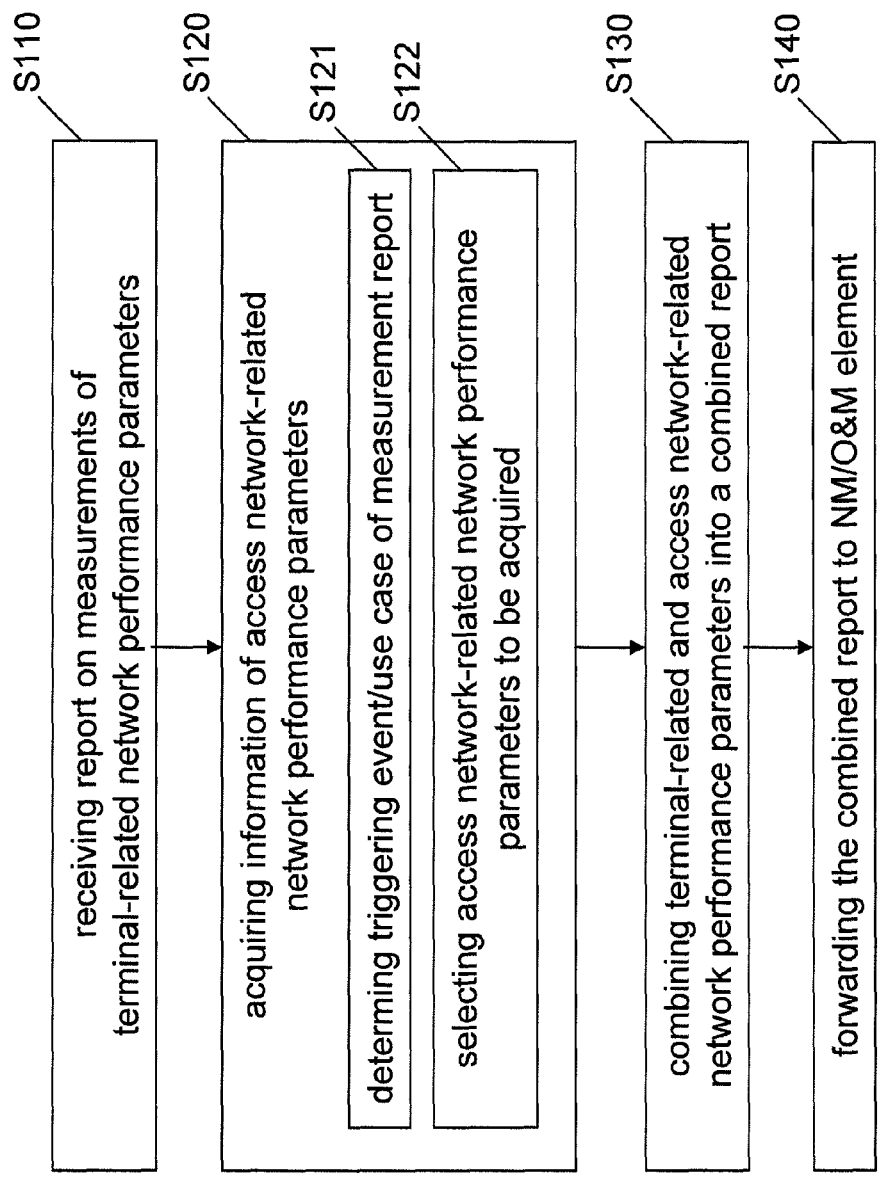
FIG. 1 shows a flowchart of a method according to exemplary embodiments of the present invention.

FIG. 1 shows a flowchart of a method according to exemplary embodiments of the present invention. The thus depicted method may for example be executed at device management element such as a device management server exemplarily being compliant with OMA (Open Mobile Alliance) specifications, as exemplified in the system architecture of FIGS. 3 and 4 below, or at an access network element such as a base (transceiver) station, NodeB or eNodeB, as exemplified in the system architecture of FIGS. 5 and 6 below.

According to the exemplary method of FIG. 1, in operation S110, the executing apparatus (e.g. a receiver thereof) receives a report on measurements of terminal-related network performance parameters from a terminal such as a user equipment UE, i.e. a UE measurement log. Such terminal-related network performance parameters may be measured and reported in accordance with one or more predefined triggers which may be periodical or based on the occurrence of a failure event. Specific sets of such terminal-related network performance parameters may be predefined for measurement and reporting purposes depending on a triggering event and/or use case thereof. For example, one or more specific set of relevant network performance parameters, i.e. one or more specific UE measurement logs, may—in terms of minimizing drive tests—be associated with any one of use cases for coverage optimization, mobility optimization, capacity optimization, parameterization for common channels, quality-of-service verification. For example, such UE measurement logs may comprise one or more of periodical radio environment or downlink pilot measurements, radio environment measurements when a serving cell becomes worse than a threshold, transmit power headroom and radio environment measurements when a terminal's transmit power becomes less than a threshold, random access details and radio environment measurements when a random access failure occurs, radio environment, location, time and cell identity measurements when a paging channel failure occurs, and radio environment, location, time, cell identity and frequency measurements when a broadcast channel failure occurs. Radio resource measurements in this regard may relate to CPICH (common pilot channel), RSCP (received signal code power), RSRP (reference signal received power), and/or RSRQ (reference signal received quality). A paging channel failure may relate to decoding error of the PDCCH (physical downlink control channel).

Figure 4:
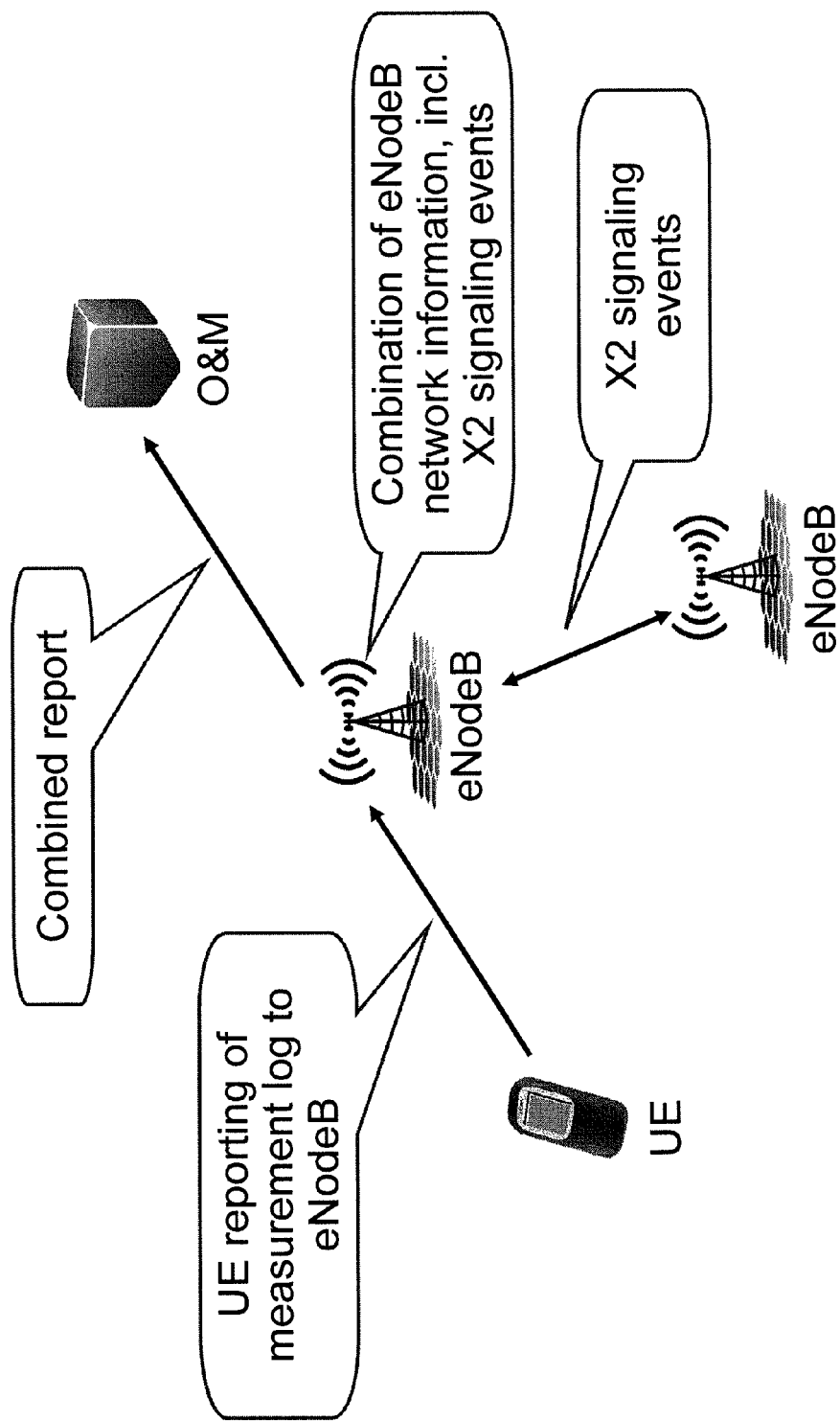
FIG. 4 shows a schematic overview of a second system architecture according to exemplary embodiments of the present invention.
Figure 5:
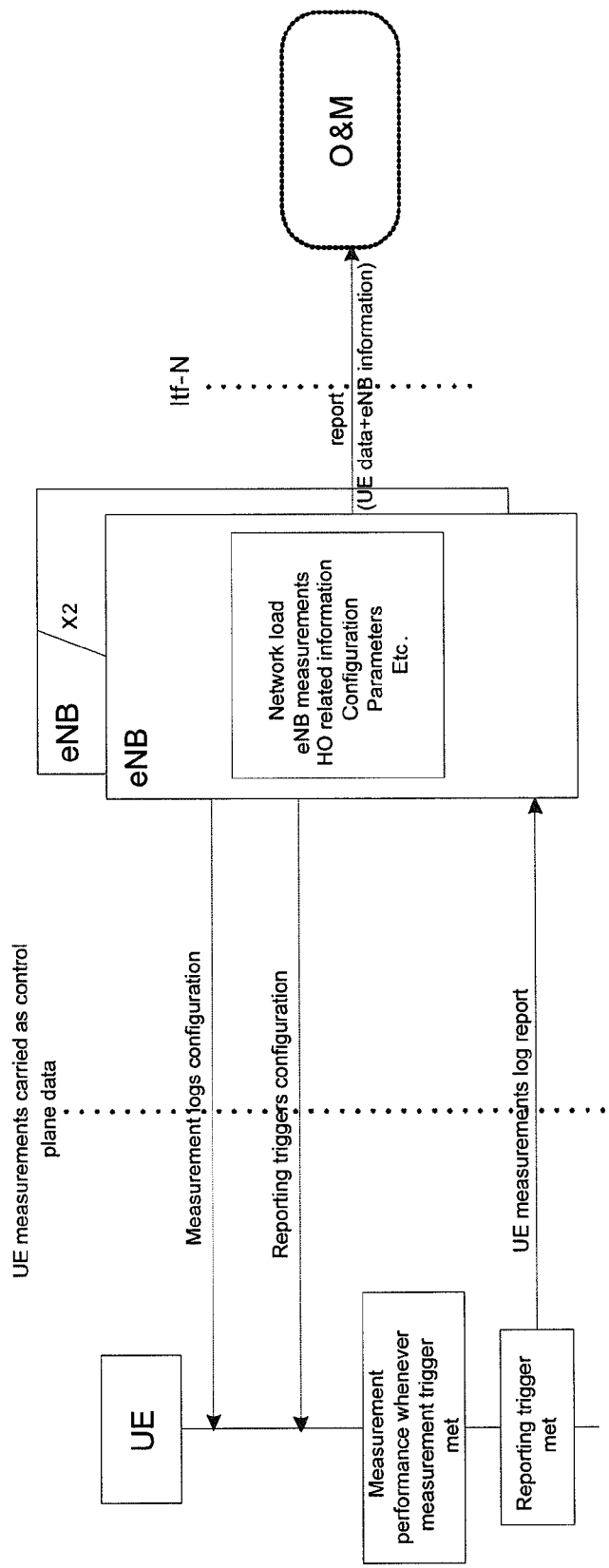
FIG. 5 shows details of a structure and procedures of the second system architecture according to exemplary embodiments of the present invention.
Figure 6:
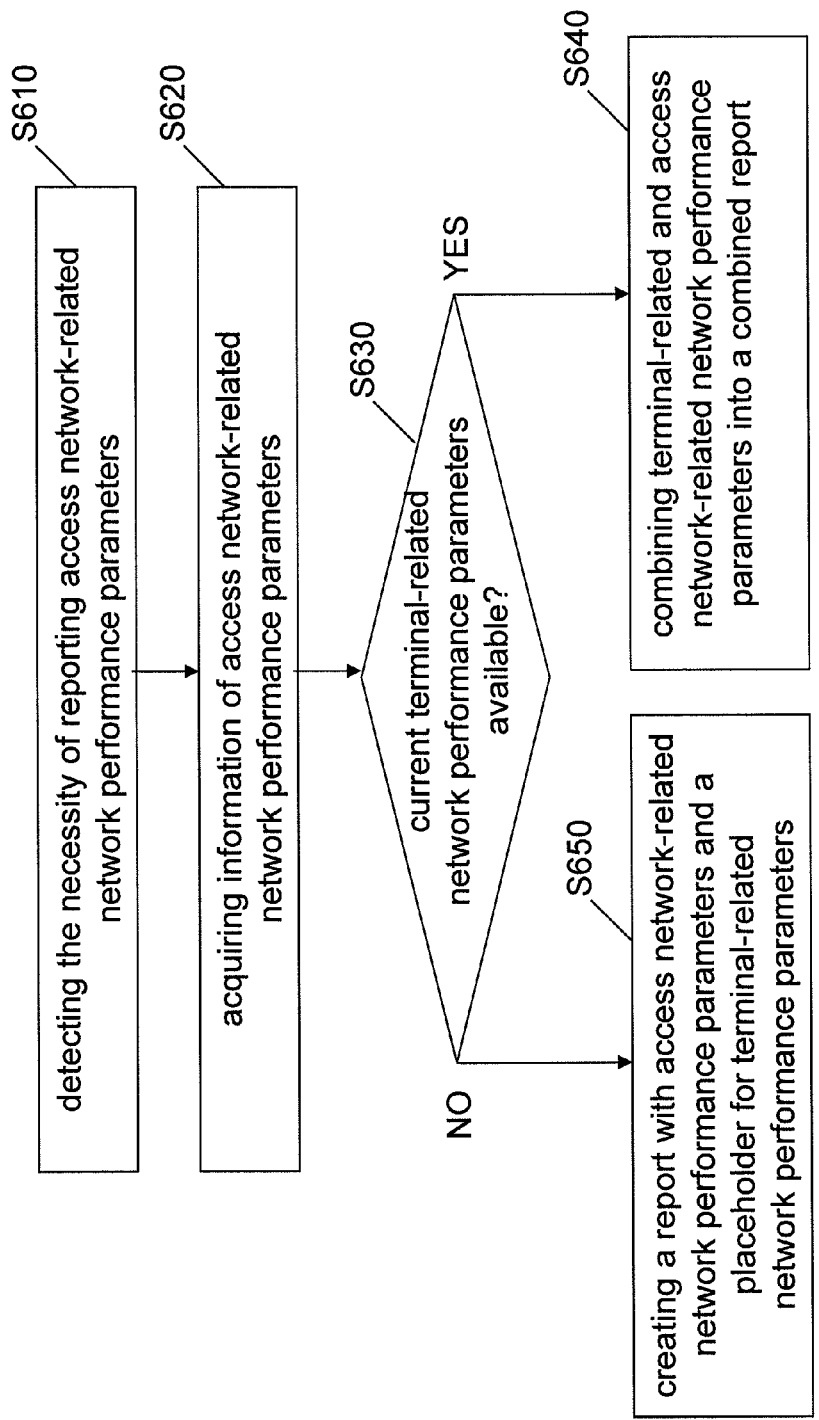
FIG. 6 shows a flowchart of a method according to exemplary embodiments of the present invention.

The above-described receiving may, depending on an underlying system scenario, be accomplished by way of a user plane transport (as in the case of FIGS. 3 and 4) or a control plane transport (as in the case of FIGS. 5 and 6).

In operation S120, the executing apparatus (e.g. a processor or dedicated acquisition unit thereof) acquires information of access network-related network performance parameters, e.g. (e)NodeB or base station information. On the one hand, all available access network-related network performance parameters may be acquired upon receipt of a UE measurement log in operation S110 (in which case the subsequently described determination and selection operations are dispensable). On the other hand, such access network-related network performance parameters may be associated with one or more predefined trigger events and/or use cases for logging and/or reporting network performance parameters at the terminal. Accordingly, on the basis of the (set of) measurements of terminal-related network performance parameters received in operation S110 and a predefined association, a triggering event and/or use case of the received measurement report may be determined (S121), and (a specific set of) access network-related network performance parameters to be acquired may be selected out of all available parameters (S122). For example, one or more specific set of relevant network performance parameters, e.g. one or more specific (e)NodeB or base station information sets, may—in terms of minimizing drive tests—be associated with any one of use cases for coverage optimization, mobility optimization, capacity optimization, parameterization for common channels, quality-of-service verification. For example, the information on access network-related network performance parameters may relate to one or more of access restriction parameters, network load parameters (e.g. concerning an own cell or one or more neighboring cells of the (e)NodeB or base station), traffic distribution parameters, congestion parameters, radio and/or hardware resource parameters, handover parameters (e.g. information on possible initiated or failed handover attempts; information if the (e)NodeB or base station in question or a potential handover candidate has experienced e.g. an overload problem or has been reset e.g. due to a software problem), mobility parameters (e.g. mobility history information concerning e.g. an identity of a previous cell of a terminal), dynamic connection parameters (e.g. information on possible dynamic parameters which may impact a connection, such as power for reference symbols, or possible activation/deactivation of carriers on some frequency or frequencies (e.g. in the context of LTE-A carrier aggregation)), signaling error parameters (e.g. possible error cases for signaling connections such as RRC (radio resource control) connections), signaling events on a X2 interface between access network elements, as well as other information from a device like the terminal (e.g. reported power headroom or reported latest CQI/CSI (CAI: channel quality indicator, CSI: channel state information) messages). For instance, a mobility optimization use case depends upon mobility and handover parameters.

Figure 3:
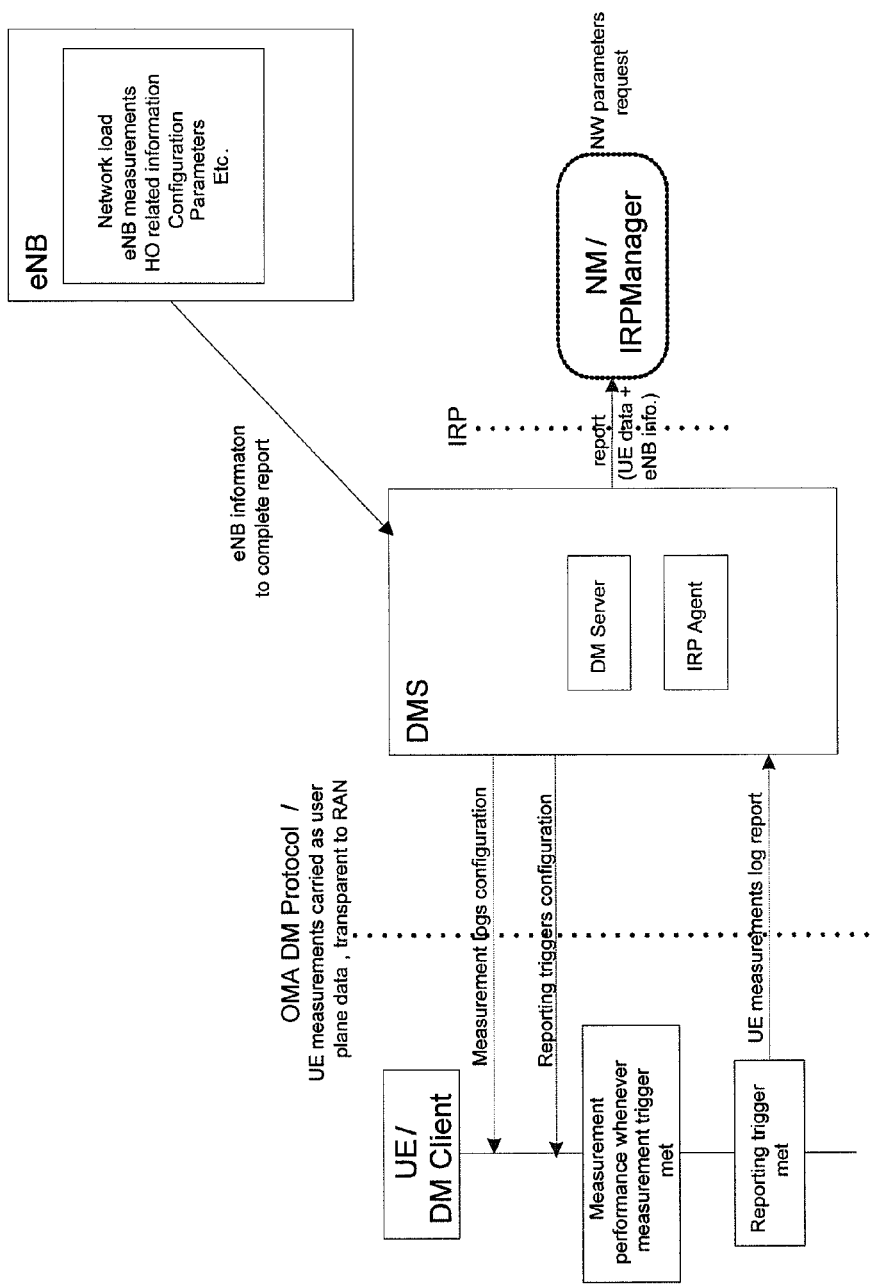
FIG. 3 shows details of a structure and procedures of the first system architecture according to exemplary embodiments of the present invention.

The above-described acquisition may, depending on an underlying system scenario, be accomplished internally at the executing apparatus (as in the case of FIGS. 5 and 6) or externally from an external apparatus being interconnected with the executing apparatus (as in the case of FIGS. 3 and 4).

In operation S130, the executing apparatus (e.g. a processor or dedicated combination unit thereof) combines the received terminal-related network performance parameters and the acquired access network-related network performance parameters, which may be all available parameters or a set of parameters being determined out of all available parameters) into a combined network performance report. Such a combining may, depending on an underlying system scenario, be accomplished by way of an attachment of the e.g. eNodeB information to the received UE measurement report (as in the case of FIGS. 3 and 4), when the combining takes place at an executing apparatus other than the UE and the e.g. eNodeB, or by way of a complementation of the received UE measurements by e.g. the eNodeB information (as in the case of FIGS. 5 and 6), when the combining takes place at the e.g. eNodeB where the relevant access network-related parameters are available anyhow.

In operation S140, the executing apparatus (e.g. a transmitter) may forward the thus created combined network performance report for network performance analysis and/or control. Yet, the forwarding may also be omitted in case network performance analysis and/or control on the basis of the thus gathered and combined parameters may be accomplished at the executing apparatus. The forwarding may, depending on an underlying system scenario, be accomplished towards a network management element such as a NM/IRP manager (NM: network management, IRP: integrated reference point) (as in the case of FIGS. 3 and 4) or towards an O&M (operation and maintenance) element (as in the case of FIGS. 5 and 6).

The above-described procedure may be equally applicable for minimizing drive tests (MDT) and/or for self-optimizing network (SON). Then, the terminal-related and/or the access network-related network performance parameters comprise parameters specific to MDT and/or SON.

In the following, two examples of system architectures for implementing exemplary embodiments of the present invention are described.

As a first exemplary system scenario, a user plane (UP) based architecture is explained.

Figure 2:
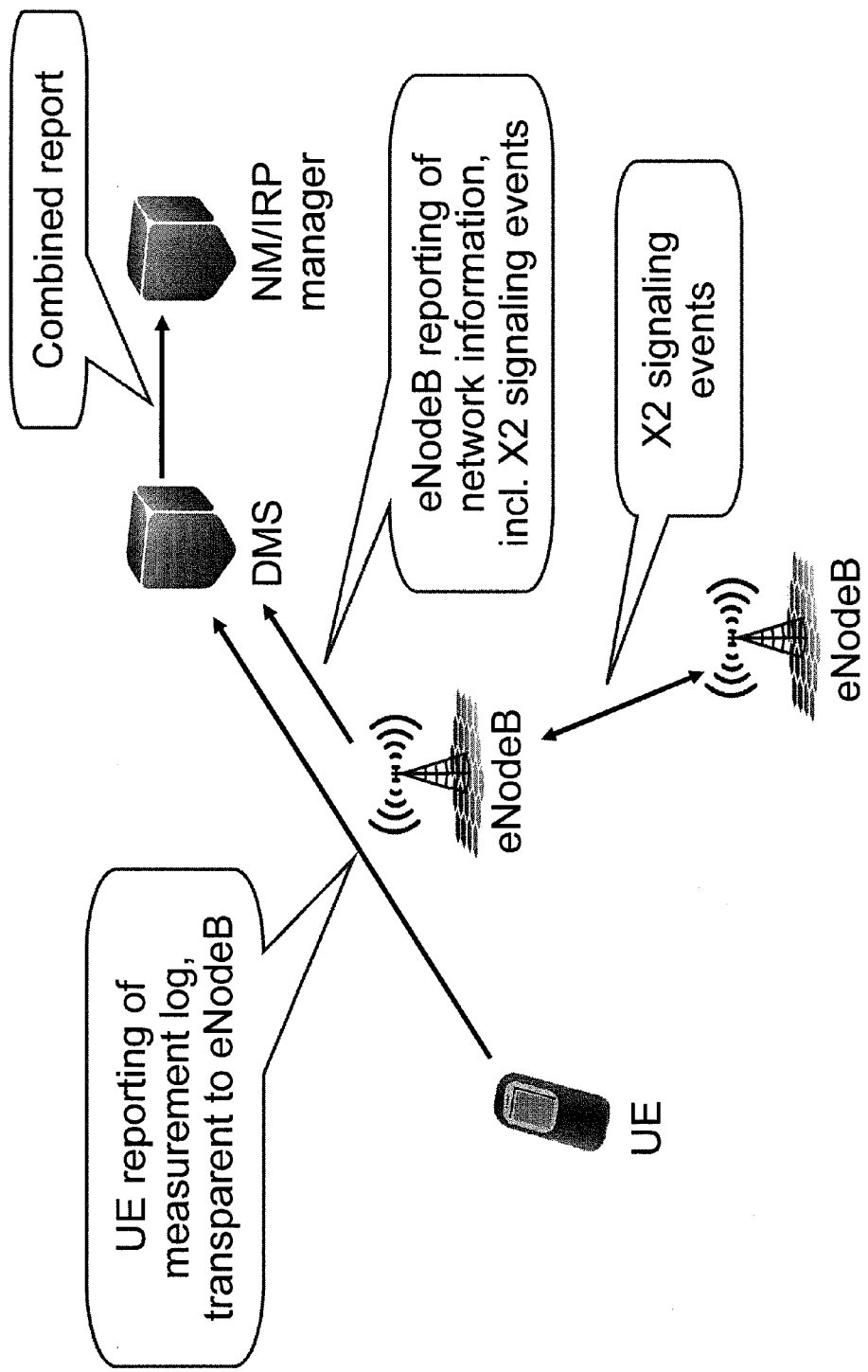
FIG. 2 shows a schematic overview of a first system architecture according to exemplary embodiments of the present invention.

FIG. 2 shows a schematic overview of a first system architecture, i.e. a UP-based system architecture, according to exemplary embodiments of the present invention.

According to the exemplary architecture of FIG. 2, a user equipment UE representing a terminal logs measurements of terminal-related network performance parameters as described above, and reports the same to a DMS representing a device management element, wherein such a reporting takes place on the user plane and is transparent to a radio access network, i.e. to an eNode B representing an access network element. The eNodeB, e.g. upon request from the DMS, gathers information of access network-related network performance parameters as described above, and reports the same to the DMS. Since the eNodeB is, for example, aware of X2 signaling events on an interface towards another eNodeB, such X2 signaling events may be included in the thus reported eNodeB information. At the DMS, the reports from the UE and the eNodeB are combined, e.g. by attaching the eNodeB information to the UE measurement report. The thus created combined report may be forwarded to a NM/IRP manager representing a network management and/or operation and maintenance element.

FIG. 3 shows details of a structure and procedures of the first system architecture, as outlined in FIG. 2, according to exemplary embodiments of the present invention.

According to the exemplary structure of FIG. 3, the user equipment UE may also comprise or operate as a device management (DM) client cooperating with the DMS at which the above-described procedure of FIG. 1 is executed. The DMS may comprise a DM server unit and an IRP agent unit cooperating with an IRP manager or an IRP manager unit at a network management element or the like. A transport between UE and DMS, which is effected on the user plane in a manner transparent to a radio access network, may be accomplished by means of a OMA DM protocol.

According to the exemplary procedures of FIG. 3, the UE, in particular its configurations for measuring and reporting terminal-related network performance parameters as described above, may be configured by the DMS. For example, a configuration for measurement logs, e.g. which (set of) parameters are to be measured for which use case or the like, and a configuration for reporting triggers, e.g. which triggers and which kind of triggers (e.g. periodical or failure-based) are effective for which measurements and/or use cases, are sent from the DMS to the UE prior to any actual network performance operation. A configuration for measurement logs may comprise e.g. instructions as to what entities/parameters are to be measured, when a failure event is met, such as when a cell becomes worse than a threshold. A configuration for reporting triggers may comprise e.g. instructions as to whether a report is to be sent immediately upon measurement, on network demand, or in a periodical manner such as every 24 hours at 3 a.m.

When a thus configured measurement trigger is met, the UE takes a corresponding measurement log. When a thus configured reporting trigger is met, the UE reports the thus taken measurement log (report) to the DMS. Upon receipt thereof, the DMS acquires corresponding access network-related network performance parameters, which in the present example case takes place by requesting such relevant information from an eNodeB representing an access network element of the access network in question, where such information are available or will be gathered upon request. The DMS may also determine and select a specific (sub-)set of access network-related parameters based on a reporting trigger and/or use case pertaining to the measurements received from the UE. The thus acquired, i.e. received, parameters are then combined with those being received from the UE into a combined network performance report. This combined report including UE data (relating to a terminal situation) and eNodeB information (relating to a (access) network situation) may then be forwarded to an NM/IRP manager via an integrated reference point (IRP), which has requested these network parameters, e.g. for network performance monitoring and/or control.

For the purpose of exchanging information between DMS and eNodeB, there is assumed the existence of a corresponding interface or reference point, such as e.g. an OMA DM interface. In addition, there is assumed a manner of requesting and transporting eNodeB complement information, which may be any conceivable manner.

As indicated above, the measurements, the measurement report, and the combined report may be specific to MDT and/or SON, respectively.

As a second exemplary system scenario, a control plane (CP) based architecture is explained.

FIG. 4 shows a schematic overview of a second system architecture, i.e. a CP-based system architecture, according to exemplary embodiments of the present invention.

According to the exemplary architecture of FIG. 4, a user equipment UE representing a terminal logs measurements of terminal-related network performance parameters as described above, and reports the same to a eNodeB representing an access network element, wherein such a reporting takes place on the control plane. The eNodeB then gathers information of access network-related network performance parameters as described above. Since the eNodeB is, for example, aware of X2 signaling events on an interface towards another eNodeB, such X2 signaling events may be included in the thus gathered eNodeB information. Then, the eNodeB combines the parameters received from the UE and the parameters gathered locally at the eNodeB, e.g. by attaching the eNodeB information to the UE measurement report. The thus created combined report may be forwarded to a O&M device representing a network management and/or operation and maintenance element.

FIG. 5 shows details of a structure and procedures of the second system architecture, as outlined in FIG. 4, according to exemplary embodiments of the present invention.

According to the exemplary structure of FIG. 5, the user equipment UE is connected with an eNodeB, which is connected to an O&M device, and which may also be connected to one or more other eNodeB's via a X2 interface, respectively. The above-described procedure of FIG. 1 is executed at the eNodeB cooperating with the UE. A transport between UE and relevant eNode is effected on the control plane.

According to the exemplary procedures of FIG. 5, the UE, in particular its configurations for measuring and reporting terminal-related network performance parameters as described above, may be configured by the eNodeB. In this regard, the same notions as outlined above in connection with FIG. 3 apply here accordingly.

When a thus configured measurement trigger is met, the UE takes a corresponding measurement log. When a thus configured reporting trigger is met, the UE reports the thus taken measurement log (report) to the eNodeB. Upon receipt thereof, the eNodeB acquires corresponding access network-related network performance parameters, which in the present example case takes place internally at the eNodeB, e.g. by querying the required information from a storage and/or performing corresponding measurements. The eNodeB may also determine and select a specific (sub-)set of access network-related parameters based on a reporting trigger and/or use case pertaining to the measurements received from the UE. The thus acquired, i.e. received, parameters are then combined with those being received from the UE into a combined network performance report. This combined report including UE data (relating to a terminal situation) and eNodeB information (relating to a (access) network situation) may then be forwarded to an O&M device via an Interface-N (Itf-N) which is built up by a number of IRPs (integrated reference points) and a related name conversion. The O&M device may have previously these network parameters, e.g. for network performance monitoring and/or control.

As indicated above, the measurements, the measurement report, and the combined report may be specific to MDT and/or SON, respectively.

Hereinbefore, it is always assumed that a connection between the terminal and the network persists during network performance monitoring and/or control. However, there may also occur a situation in which the connection between terminal and network is disconnected before the above-described operations are completed. Thus, the reporting of terminal-related network performance parameters to the DMS or the eNodeB may be disabled or delayed, thus affecting the further operations of network performance monitoring and/or control.

For example, a terminal connection may be lost due to a sudden effect such as the driving into tunnel without radio access coverage. If so, the terminal may not be able to send its measurement report, and/or the network side may not be able to initiate any specific problem report for handling such a situation before the connection is lost.

In the exemplary situation of a CP-based architecture according to FIGS. 4 and 5, it may for example be the case that the UE, after having been disconnected from the eNodeB, re-enters network coverage in the area of another eNodeB. Such a case is quite likely in case of a tunnel being passed by the UE. Then, the previous eNodeB will vainly wait for the receipt of UE measurements, which would disable the further operations as described above.

Accordingly, operations are needed for dealing with the case that UE measurement may not be received where they are needed for network performance monitoring and/or control purposes.

FIG. 6 shows a flowchart of a method according to exemplary embodiments of the present invention.

In operation S610, a necessity of reporting access-related network performance parameters may be detected, for example by expiry of a timer since the previous report of such parameters or since receipt of an UE measurement report, detection of connection loss towards the UE, or the like. Then, in operation S620, access-related network performance parameters may be (internally or externally) acquired as described beforehand. Then, if current terminal-related network performance parameters are available (i.e. YES in S630), a combined report may be created (and forwarded) anyhow in operation S640. Yet, if no current terminal-related network performance parameters are available (i.e. NO in S630), there may be created a report in operation S650, which contains access network-related network performance parameters but no terminal-related network performance parameters are available. In order to enable the later on supplementing with such terminal-related network performance parameters (at the present or any other entity), this report may contain a placeholder for such parameters and/or information enabling the later combination with such parameters.

In this regard, a non-combined report according to operation S650 may be sent with a time stamp being included therein. This may facilitate observance of temporal relations in the further operations. Although not illustrated in FIG. 6, the terminal, after having been re-connected with the new eNodeB, may provide an error report or a log of the disconnecting event having been occurred in addition to its measurement report. This may facilitate the further operation by providing knowledge about the cause of the disconnection, which may also contribute to network performance monitoring and/or control.

Thereby, a report of access network-related network performance parameters is possible when required even if no terminal-related network performance parameters are available, i.e. without the need to wait for the receipt of UE measurements which could never arrive due to a previous inter-eNodeB handover.

An operation as exemplarily illustrated by FIG. 6 may for example be executed at a DMS entity according to FIGS. 2 and 3, an O&M entity according to FIGS. 4 and 5, and/or an eNodeB according to any one of FIGS. 2 to 5.

In case of an execution at an eNodeB according to any one of FIGS. 2 to 5, the operations S630 and S640 may be omitted, and the report with the access network-related network performance parameters may be forwarded towards the DMS.

In case of an execution at DMS/O&M according to any one of FIGS. 2 to 5, even if operation S650 is performed first, operation S640 may then be performed after intermediate receipt of necessary terminal-related network performance parameters.

It is to be noted that the operations of FIGS. 1 and 6 may be performed independent of each other as well as in any conceivable combination in terms of a co-located execution at a single entity or a distribution over different entities and in terms of a temporal flow. Stated in other words, effects of exemplary embodiments of the present invention described herein may be outlined as follows.

The enhanced reporting data containing UE measurement logs (e.g. defined for MDT purposes) accompanied by network information enables a more efficient diagnosis of a certain problem or failure situation in the network. As describe above, the monitoring of predefined triggers is performed at the UE side. When a specific event happens, the UE performs relevant measurements depending on the triggering event, which is associated further with one or more specific use case(s). Each event and network problem is associated with a relevant set of parameters at the network side. For instance, a mobility optimization use case depends upon mobility and handover parameters, which reside at the network. Therefore, the number of network information, by which the UE measurements are complemented according embodiments of the present invention, has a value when determining the reason or evaluation of problems experienced by an end-user. Accordingly, measurements coming from the UE are jointly taken into account with appropriate network data.

In principle, an implementation of embodiments of the present invention is independent of architectural aspects, i.e. a transport mechanism utilized for UE measurement reporting. According to the above examples of system architectures, the network entity (OMA DM server or eNodeB) responsible for policy control and/or configuration of measurements logging may assist the reports from the UE and the network information. In case of a user plane based architecture, DMS is the recipient of the reports sent from the UE and the eNodeB. Therefore, as an independent network entity, the DMS is able to communicate with an eNodeB and to request relevant network information available to serve, since being normally operated at the eNodeB. In case of a control plane based architecture, eNodeB is the recipient of the reports sent from the UE and the point where eNodeB information is available. This approach is simpler and easier in terms of data reporting from the network side, since the network entity is basically the eNodeB itself. Besides, the radio interface utilized to configure and report UE measurements is prepared and available for service.

Anyhow, regardless of the transport mechanism utilized, the merit of embodiments of the present invention is that problems or deficiencies in network performance monitoring and/or controlling (e.g. for MDT purposes) may be efficiently overcome. While different measurements provided by the UE are complemented by respective eNodeB information, detection probability for network problems and/or failures increases. For example, the UE and eNodeB feedback help to ease the operator burden to perform live drive testing and result in OPEX (operating expenditures) savings. In addition, it is advantageous that the reports from the UE may be categorized depending on the network situation when a certain event occurred, and thus a required analysis is easier for solving the network problems and/or failures. Many of the required network-related information is readily available at the eNodeB. The UE measurements considered separately may then, for example, be used also for e.g. SON purposes. That also allows utilizing the same UE functionality for different functions (e.g. MDT and SON) with avoidance of redundant implementation complexity.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIGS. 7 and 8, while for the sake of brevity reference is made to the detailed description of respective corresponding methods and operations according to FIGS. 1 to 6, respectively.

Figure 7:
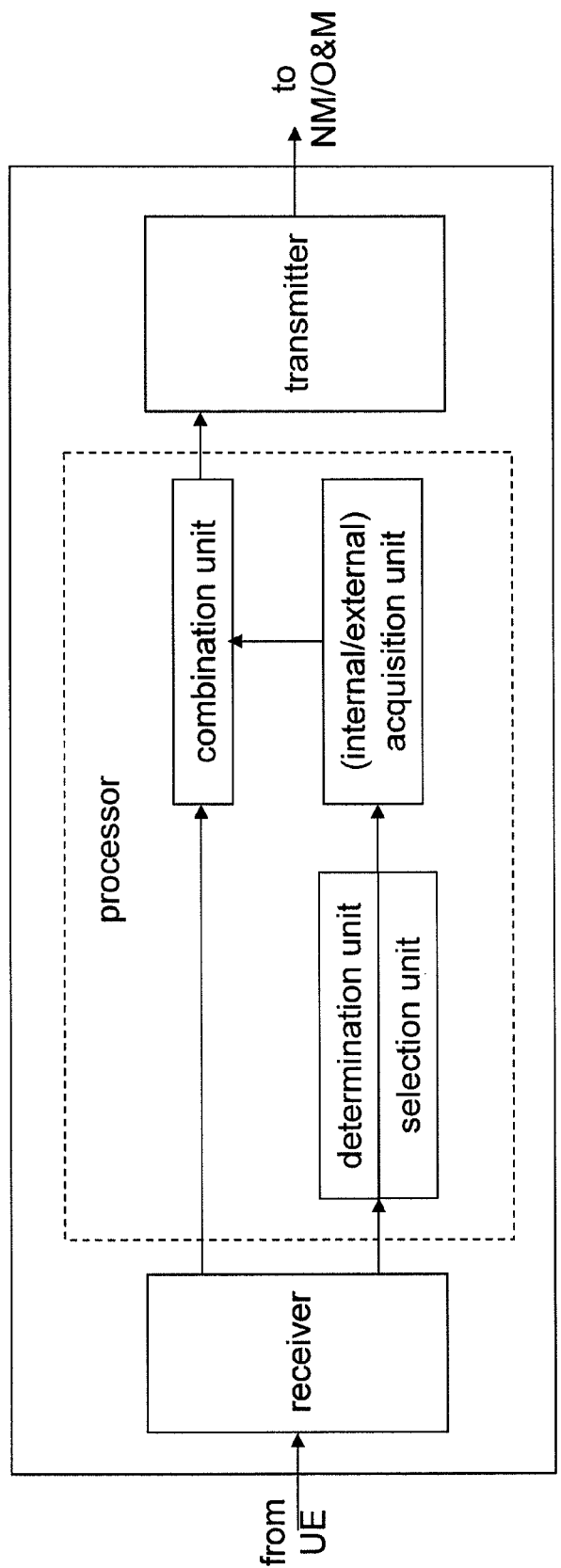
FIG. 7 shows a block diagram of an apparatus according to exemplary embodiments of the present invention.
Figure 8:
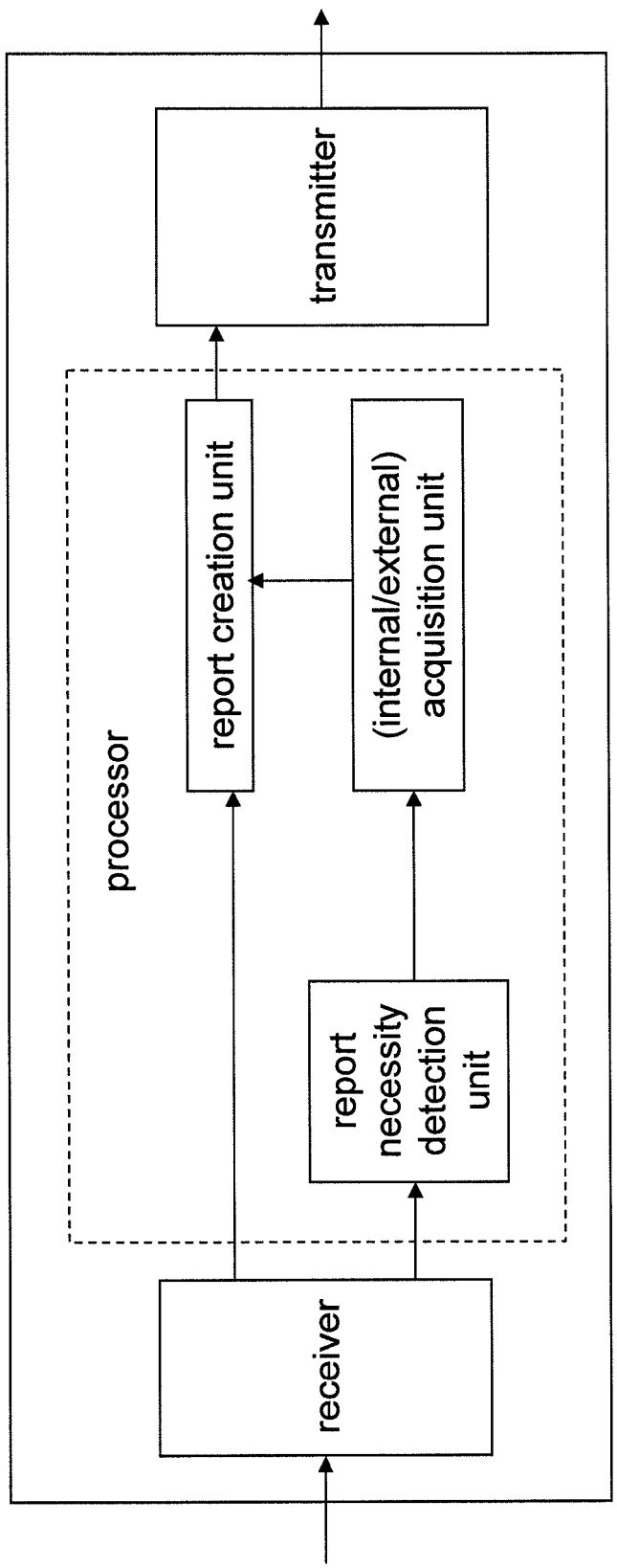
FIG. 8 shows a block diagram of an apparatus according to exemplary embodiments of the present invention.

In FIGS. 7 and 8 below, the solid line blocks are basically configured to perform respective operations as described above. The entirety of solid line blocks are basically configured to perform the methods and operations as described above, respectively. With respect to FIGS. 7 and 8, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIGS. 7 and 8, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 7 shows a block diagram of an apparatus according to exemplary embodiments of the present invention. In view of the above, the thus described apparatus may be implemented by or at a device management element such as e.g. a DMS according to FIGS. 2 and 3, or an access network element such as e.g. an eNodeB according to FIGS. 4 and 5.

According to FIG. 7, the apparatus according to exemplary embodiments of the present invention is configured to perform a method as described in conjunction with FIG. 1. Therefore, while basic operations are described hereinafter, reference is made to the above description for details.

According to an exemplary embodiment depicted in FIG. 7, the thus depicted apparatus comprises a receiver, an acquisition unit, a combination unit, a determination unit, a selection unit, and a transmitter. It is to be noted that the one or more of the acquisition, combination, determination, and selection units may be implemented by a processor. Further, it is to be noted that the determination and selection units may be omitted in case no selection of appropriate network performance parameters is desired. For a basic implementation, the transmitter may also be omitted, as the forwarding of a combined report is not necessary according to all embodiments of the present invention.

The receiver may be configured to receive a report on measurements of terminal-related network performance parameters from a terminal, thus representing means for receiving such terminal information. The receiver may be configured to receive the measurement report from the terminal as user plane data or as control plane data. The acquisition unit may be configured to acquire information of access network-related network performance parameters, thus representing means for acquiring such network information. As outlined above, the acquisition unit may be configured to accomplish the acquisition externally, e.g. from an access network element, or internally, e.g. at an access network element. The external acquisition may be applicable when the thus depicted apparatus located at a DMS or the like, and may be accomplished by way of an interface (transceiver) towards an eNodeB or the like. The internal acquisition may be applicable when the thus depicted apparatus located at an eNodeB or the like, and may be accomplished by way of a local storage and/or a measuring unit. The combination unit is configured to combine the received terminal-related network performance parameters from the receiver and the acquired access network-related network performance parameters from the acquisition unit, e.g. into a combined network performance report, thus representing means for combining relevant network performance parameters from different sources. The transmitter may be configured to forward the combined network performance report from the combination unit to a network management element and/or an operation and maintenance element, such as e.g. an NM/IRP manager or an O&M device, e.g. for network performance analysis and/or control, thus representing means for forwarding combined network performance parameters.

According to embodiments of the present invention, the determination unit may be configured to determine a triggering event and/or use case of the received measurement report, thus representing means for determining a context of a received measurement report. The determination unit may be configured to accomplish the determination on the basis of a predefined association between a triggering event and/or use case and measurements to be performed at the terminal, which may be stored at a local storage. The selection unit may be configured to select access network-related network performance parameters to be acquired based on the determined triggering event and/or use case, thus representing means for selecting appropriate network information in view of received terminal information.

For the purpose of transmitting the combined report from said apparatus to a device management and/or operation an maintenance element, there is assumed the existence of a corresponding interface or reference point between e.g. eNodeB or DMS and NM/IRP manager or O&M device, as well as a corresponding manner for such a transmission.

In case of WCDMA, the entity handling a functionality according to embodiments of the present invention, i.e. the apparatus as exemplarily depicted by FIGS. 7 and 8, may be a radio network controller (RNC) or a NodeB with co-located RNC functionality such as for example in case of a flat architecture solution e.g. of an Internet High speed Packet Access (I-HSPA).

According to certain embodiments of the present invention, the terminal such as a user equipment UE or the like is configured to cooperate with the above-described apparatus, i.e. a DMS or eNode operating according to embodiments of the present invention. Accordingly, a terminal according to embodiments of the present invention is configured to receive configuration information concerning measurement logs and/or reporting triggers from said apparatus, to perform corresponding measurements for creating corresponding measurement logs, and to report such measurement logs correspondingly via user plane or control plane.

According to certain embodiments of the present invention, the network management element such as a NM/IRP manager and/or an operation and maintenance element such as an O&M device is configured to cooperate with the above-described apparatus, i.e. a DMS or eNode operating according to embodiments of the present invention. Accordingly, a network management element and/or operation and maintenance element according to embodiments of the present invention is configured to receive a combined network performance report from said apparatus, and, possibly, to request corresponding network performance parameters and/or to perform network performance analysis and/or control based thereon.

FIG. 8 shows a block diagram of an apparatus according to exemplary embodiments of the present invention. In view of the above, the thus described apparatus may be implemented by or at a device management element such as e.g. a DMS according to FIGS. 2 and 3, an operation and maintenance element such as e.g. O&M according to FIGS. 4 and 5, and/or an access network element such as e.g. an eNodeB according to FIGS. 2 to 5.

According to FIG. 8, the apparatus according to exemplary embodiments of the present invention is configured to perform a method as described in conjunction with FIG. 6. Therefore, while basic operations are described hereinafter, reference is made to the above description for details.

According to an exemplary embodiment depicted in FIG. 8, the thus depicted apparatus comprises a receiver, an acquisition unit, a report creation unit, a report necessity detection unit, and a transmitter. It is to be noted that one or more of the acquisition, report creation, and report necessity detection units may be implemented by a processor. For a basic implementation, the transmitter may be omitted, as the forwarding of a combined or non-combined report is not necessary according to all embodiments of the present invention.

The receiver may be configured to receive signals from the outside of the thus depicted apparatus, e.g. UE measurement reports or information necessary for detection of a reporting necessity, thus representing means for receiving. The report necessity detection unit may be configured to detect a necessity for reporting access network-related network performance parameters, thus representing means for detecting a reporting necessity. The acquisition unit may be configured to (internally or externally) acquire such access network-related network performance parameters, thus representing means for acquiring network performance parameters. The report creation unit may be configured to create an appropriate report on the basis of the available information, i.e. a combined report in case of availability of both terminal-related and access network-related network performance parameters, or a non-combined report in case of availability of only access network-related network performance parameters. Thus, the report creation unit represents means for creating an appropriate network performance report. The transmitter may be configured to forward the thus created report when and where appropriate, thus representing means for sending a network performance report.

Stated in other words, the apparatus may be configured to send a measurement report of access network-related parameters without waiting for a report from the terminal, especially in the case the terminal connection is lost and the terminal may be expected to access the network again via another apparatus than before, the terminal lacking additional reporting capability or is otherwise determined to be subject to malfunction. If the apparatus provides a report without combining it with the report from the terminal, then it is beneficial to provide additional information in the report that allows to combine the report at later phase with possible information received from the terminal. The information to allow such a later combining may e.g. include time stamp, type of the (disconnecting) event experienced, terminal identity, and/or related cell and location information, as well as information received earlier from the terminal such as handover measurement report data or the like.

For example, the terminal identity may be particularly beneficial when there is (to be) a correlation between terminal-related and access network-related network performance parameters. Namely, when access network-related parameters correlate with terminal-related parameters of one or more specific terminals, the need for reporting access network-related parameters may be detected in relation with such specific terminal(s), and after sending a non-combined report due to the lack of such parameters a later combination may be advantageously accomplished by terminal-related parameters of such specific terminal(s) being identified by the terminal identity or identities used as additional information in the non-combined report.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable storage medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bi-polar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

In the above, there are disclosed measures for enhancing network performance monitoring. Such measures may for example comprise receiving a report on measurements of terminal-related network performance parameters from a terminal, acquiring information of access network-related network performance parameters, and combining the received terminal-related network performance parameters and the acquired access network-related network performance parameters into a combined network performance report.

Even though the invention is described above with reference to the examples according to the accompanying drawings, it is to be understood that the invention is not restricted thereto. Rather, it is apparent to a skilled person that the present invention can be modified in many ways without departing from the scope of the inventive idea as disclosed herein.

The invention claimed is:

1. A method comprising:
in a terminal in a radio access network,
receiving measurement configuration information from a network management element via an access network element in the radio access network;
performing measurements of terminal-related network performance parameters using the measurement configuration information;
creating a measurement report by attaching to the measurements of the terminal-related network performance parameters corresponding location information available at the terminal; and
transmitting the measurement report to the network management element in a core network connected to the radio access network, via the access network element,
wherein the measurement report is transmitted using a combined network performance report from the access network element to the network management element,
the combined network performance report is formed by attaching access network-related network performance parameters to the measurement report, wherein the access network-related network performance parameters comprise parameters specific to minimization of drive tests for network performance monitoring,
the access network-related network performance parameters are acquired by the access network element based on a triggering event and/or use case pertaining to the measurements of the terminal-related network performance parameters in the measurement report, and
the access network-related network performance parameters are measurements performed at the access network element.

2. The method according to claim 1, wherein the access network-related network performance parameters are acquired by the access network element upon reception of the measurement report from the terminal.

3. The method according to claim 1, wherein the network management element comprises an open mobile alliance device management server.

4. The method according to claim 1, wherein the measurements of terminal-related network performance parameters comprise one or more of periodical radio environment or downlink pilot measurements, radio environment measurements when a serving cell becomes worse than a threshold, transmit power headroom and radio environment measurements when a terminal's transmit power becomes less than a threshold, random access details and radio environment measurements when a random access failure occurs, radio environment, location, time and cell identity measurements when a paging channel failure occurs, and radio environment, location, time, cell identity and frequency measurements when a broadcast channel failure occurs.

5. The method according to claim 1, wherein the measurement report is categorized separately for minimization of drive tests and self-optimization of networks.

6. The method according to claim 1, wherein the measurement report allows utilizing a same UE functionality for minimization of drive tests and self-optimization of networks.

7. An apparatus in a radio access network, comprising:
at least one processor; and
at least one memory including computer program code, the at least one memory and the computer program code being configured, with the at least one processor, to cause the apparatus to perform the following:
receive measurement configuration information from a network management element via an access network element in the radio access network;
perform measurements of terminal-related network performance parameters using the measurement configuration information;
create a measurement report by attaching to the measurements of the terminal-related network performance parameters corresponding location information available at the terminal; and
transmit the measurement report to the network management element in a core network connected to the radio access network, via the access network element,
wherein the measurement report is transmitted using a combined network performance report from the access network element to the network management element,
the combined network performance report is formed by attaching access network-related network performance parameters to the measurement report, wherein the access network-related network performance parameters comprise parameters specific to minimization of drive tests for network performance monitoring,
the access network-related network performance parameters are acquired by the access network element based on a triggering event and/or use case pertaining to the measurements of the terminal-related network performance parameters in the measurement report, and
the access network-related network performance parameters are measurements performed at the access network element.

8. The apparatus according to claim 7, wherein the access network-related network performance parameters are acquired by the access network element upon reception of the measurement report from the apparatus.

9. The apparatus according to claim 7, wherein the measurement report allows utilizing a same UE functionality for minimization of drive tests and self-optimization of networks.

10. A method comprising:
in an access network element in a radio access network,
receiving a measurement report on measurements of terminal-related network performance parameters from a terminal served by the access network element, wherein the measurement report comprises the measurements of the terminal-related network performance parameters and corresponding location information available at the terminal;
acquiring information of access network-related network performance parameters based on a triggering event and/or use case pertaining to the measurements of the terminal-related network performance parameters in the measurement report, wherein the acquired access network-related network performance parameters are measurements performed at the access network element and wherein the access network-related network performance parameters comprise parameters specific to minimization of drive tests for network performance monitoring;
forming a combined network performance report by attaching the acquired access network-related network performance parameters to the measurement report; and
forwarding the combined network performance report to a network entity in a core network connected to the radio access network.

11. The method according to claim 10, comprising determining the access network-related network performance parameters upon reception of the measurement report from the terminal.

12. The method according to claim 10, wherein the measurements of terminal-related network performance parameters comprise one or more of periodical radio environment or downlink pilot measurements, radio environment measurements when a serving cell becomes worse than a threshold, transmit power headroom and radio environment measurements when a terminal's transmit power becomes less than a threshold, random access details and radio environment measurements when a random access failure occurs, radio environment, location, time and cell identity measurements when a paging channel failure occurs, and radio environment, location, time, cell identity and frequency measurements when a broadcast channel failure occurs.

13. The method according to claim 10, wherein the measurement report from the terminal is categorized separately for minimization of drive tests and self-optimization of networks.

14. The method according to claim 10, wherein the measurement report from the terminal allows utilizing a same UE functionality for minimization of drive tests and self-optimization of networks.

15. An apparatus in a radio access network, comprising:
at least one processor; and
at least one memory including computer program code, the at least one memory and the computer program code being configured, with the at least one processor, to cause the apparatus to perform the following:
receive a measurement report on measurements of terminal-related network performance parameters from a terminal served by the apparatus, wherein the report comprises the measurements of the terminal-related network performance parameters and corresponding location information available at the terminal;
acquire information of access network-related network performance parameters based on a triggering event and/or use case pertaining to the measurements of the terminal-related network performance parameters in the measurement report, wherein the acquired access network-related network performance parameters are measurements performed at the access network element and wherein the access network-related network performance parameters comprise parameters specific to minimization of drive tests for network performance monitoring;
form a combined network performance report by attaching the acquired access network-related network performance parameters to the measurement report; and
forwarding the combined network performance report to a network entity in a core network connected to the radio access network.

16. The method according to claim 15, comprising determining the access network-related network performance parameters upon reception of the measurement report from the terminal.

17. The method according to claim 15, wherein the measurements of terminal-related network performance parameters comprise one or more of periodical radio environment or downlink pilot measurements, radio environment measurements when a serving cell becomes worse than a threshold, transmit power headroom and radio environment measurements when a terminal's transmit power becomes less than a threshold, random access details and radio environment measurements when a random access failure occurs, radio environment, location, time and cell identity measurements when a paging channel failure occurs, and radio environment, location, time, cell identity and frequency measurements when a broadcast channel failure occurs.

* * * * *